(12) United States Patent
Chen et al.

(10) Patent No.: US 12,237,683 B2
(45) Date of Patent: Feb. 25, 2025

(54) PHOTOVOLTAIC RAPID SHUTDOWN SYSTEM AND CONTROL METHOD THEREFOR

(71) Applicant: Sungrow Power Supply Co., Ltd., Hefei (CN)

(72) Inventors: Qiaodi Chen, Hefei (CN); Yu Yang, Hefei (CN); Jun Xu, Hefei (CN)

(73) Assignee: Sungrow Power Supply Co., Ltd., Hefei (CN)

( * ) Notice: Subject to any disclaimer, the term of this patent is extended or adjusted under 35 U.S.C. 154(b) by 16 days.

(21) Appl. No.: 18/279,141

(22) PCT Filed: Mar. 3, 2022

(86) PCT No.: PCT/CN2022/078966
§ 371 (c)(1),
(2) Date: Aug. 28, 2023

(87) PCT Pub. No.: WO2022/199345
PCT Pub. Date: Sep. 29, 2022

(65) Prior Publication Data
US 2024/0146067 A1    May 2, 2024

(30) Foreign Application Priority Data
Mar. 23, 2021 (CN) .......................... 202110307926.5

(51) Int. Cl.
*H02J 3/38* (2006.01)
*H02J 3/00* (2006.01)
*H02J 3/01* (2006.01)

(52) U.S. Cl.
CPC ............... *H02J 3/38* (2013.01); *H02J 3/001* (2020.01); *H02J 3/01* (2013.01); *H02J 2300/26* (2020.01)

(58) Field of Classification Search
CPC ...... H02J 3/38; H02J 3/001; H02J 3/01; H02J 2300/26
See application file for complete search history.

(56) References Cited

U.S. PATENT DOCUMENTS

| | | | |
|---|---|---|---|
| 10,348,094 B2* | 7/2019 | White | H02S 40/32 |
| 2012/0042588 A1 | 2/2012 | Erickson, Jr. | |
| 2023/0170707 A1* | 6/2023 | Haer | H02J 3/001 307/85 |

FOREIGN PATENT DOCUMENTS

| | | |
|---|---|---|
| CN | 109038669 A | 12/2018 |
| CN | 109617523 A | 4/2019 |

(Continued)

OTHER PUBLICATIONS

International Search Report and Written Opinion for International Application No. PCT/CN2022/078966, mailed Apr. 27, 2022.

(Continued)

*Primary Examiner* — Carlos Amaya
(74) *Attorney, Agent, or Firm* — Wolf, Greenfield & Sacks, P.C.

(57) ABSTRACT

A rapid shutdown system and a method for controlling the rapid shutdown system are provided. A disturbance is applied to a direct-current side of an inverter in the rapid shutdown system only when the inverter does not meet a starting condition, i.e., before the inverter starts. Once meeting the starting condition, the inverter normally operates. A shutdown device in the rapid shutdown system determines its state by determining whether the electrical signal at its output end meets the preset condition, and switches itself on or off in response to its determination.

15 Claims, 5 Drawing Sheets

(56) References Cited

FOREIGN PATENT DOCUMENTS

| CN | 110970918 A | 4/2020 |
|---|---|---|
| CN | 111478290 A | 7/2020 |
| CN | 111585307 A | 8/2020 |
| CN | 111585308 A | 8/2020 |
| CN | 111740392 A | 10/2020 |
| CN | 111864802 A | 10/2020 |
| CN | 112821458 A | 5/2021 |
| WO | WO 2020/000864 A1 | 1/2020 |

OTHER PUBLICATIONS

Chinese Office Action dated Jul. 26, 2023, in connection with Chinese Application No. 202110307926.5.

Hang Wei et al., Research on characteristics of grid-connected photovoltaic power stations in Zhejiang. East Chine Electric Power. Oct. 2009;37(10). 5 Pages.

Zhao et al., A Modified Hybrid Modulation Strategy for Suppressing DC Voltage Fluctuation of Cascaded H-Bridge Photovoltaic Inverter. IEEE Transactions on Industrial Electronics.May 5, 2018;65(5):3932-41.

* cited by examiner

PHOTOVOLTAIC RAPID SHUTDOWN SYSTEM AND CONTROL METHOD THEREFOR

This application is a national stage filing under 35 U.S.C. § 371 of International Patent Application Serial No. PCT/CN2022/078966, filed Mar. 3, 2022, which claims priority to Chinese Patent Application No. 202110307926.5 titled "RAPID SHUTDOWN SYSTEM, AND METHOD FOR CONTROLLING THE SAME", filed on Mar. 23, 2021 with the China National Intellectual Property Administration. The contents of these applications are incorporated herein by reference in their entireties.

FIELD

The present disclosure relates to the technical field of automatic control, and in particular to a rapid shutdown system, and a method for controlling the rapid shutdown system.

BACKGROUND

The existing rapid shutdown system protects a photovoltaic string in response to a malfunction in a single element or module, i.e., a single point of failure by limiting a direct-current output voltage to not more than 30V as specified in the standard 2EC690.12.

Specifically, a shutdown device in the rapid shutdown system remains in an ON state when constantly receiving a communication signal, i.e., a conduction signal, and a photovoltaic string corresponding to the shutdown device normally outputs electrical energy. The shutdown device switches itself off in response to its failure to receive the communication signal, and the photovoltaic string fails to output the electrical energy accordingly. However, in practice, the shutdown device may mistakenly switch itself off due to inaccurate determination, resulting in shutdown and self-test of a downstream converter, and consequently inefficiency in the system.

In order to solve this problem, a disturbance signal is constantly applied to a direct-current bus of an inverter as a heartbeat signal for controlling the shutdown device in the existing method for starting the rapid shutdown system, which inevitably increases the complexity of controlling the rapid shutdown system and impacts on the MPPT, resulting in a decline in production of electricity.

SUMMARY

A rapid shutdown system and a method for controlling the rapid shutdown system are provided according to the present disclosure in order to simplify controlling of the rapid shutdown system, thereby reducing the impact on the MPPT and then reducing the loss of production of electricity.

In order to achieve the above objectives, the following technical solutions are provided according to the present disclosure.

In an aspect of the present disclosure, the method for controlling the rapid shutdown system includes: determining whether a starting condition is met, by an inverter in the rapid shutdown system; starting the inverter if it is determined that the starting condition is already met, and applying a disturbance to a direct-current side of the inverter by the inverter if it is determined that the starting condition is not met; determining whether an electrical signal at an output end of a shutdown device in the rapid shutdown system meets a preset condition, by the shutdown device; and switching the shutdown device on or maintaining the shutdown device in an ON state if it is determined that the electrical signal already meets the preset condition, and switching the shutdown device off or maintaining the shutdown device in an OFF state if it is determined that the electrical signal does not meet the preset condition.

In an embodiment, the determining whether the electrical signal at the output end of the shutdown device in the rapid shutdown system meets the preset condition follows the applying the disturbance to the direct-current side of the inverter by the inverter. The shutdown device switches itself on if it is determined that the electrical signal already meets the preset condition. Alternatively, the shutdown device remains in the OFF state if it is determined that the electrical signal does not meet the preset condition.

In an embodiment, the determining whether the electrical signal at the output end of the shutdown device in the rapid shutdown system meets the preset condition follows the starting the inverter. The shutdown device remains in the ON state if it is determined that the electrical signal already meets the preset condition. Alternatively, the shutdown device switches itself off if it is determined that the electrical signal does not meet the preset condition.

In an embodiment, the inverter is a single-stage inverter, and the applying the disturbance includes: disconnecting the inverter from a downstream circuit and switching at least one branch in an inverter bridge in the inverter on and off at preset intervals, by the inverter.

In an embodiment, the inverter is a two-stage inverter, and the applying the disturbance includes: disconnecting the inverter from a downstream circuit, operating a direct-current conversion circuit in the inverter in a shoot through mode, and switching at least one branch in an inverter bridge in the inverter on and off at preset intervals.

In an embodiment, the inverter is a two-stage inverter, and the applying the disturbance includes: disconnecting the inverter from a downstream circuit and switching a switch transistor between a positive branch and a negative branch in a direct-current conversion circuit in the inverter on and off at preset intervals.

In an embodiment, the starting condition is that a voltage at the direct-current side of the inverter reaches a starting voltage of the inverter.

In an embodiment, the preset condition is that the electrical signal has a preset fluctuation.

In an embodiment, the determining whether the electrical signal at the output end of the shutdown device in the rapid shutdown system meets the preset condition follows the applying the disturbance to the direct-current side of the inverter by the inverter, and the preset fluctuation is a preset pulse.

In an embodiment, the determining whether the electrical signal at the output end of the shutdown device in the rapid shutdown system meets the preset condition follows the starting the inverter, the preset fluctuation is a direct-current ripple due to coupling between alternating-current power and direct-current power of the inverter in a case that the inverter is a single-stage inverter, and the preset fluctuation is a double line frequency ripple at the direct-current side of the inverter presented without applying a double line frequency ripple suppression algorithm for a direct-current conversion circuit in the inverter in a case that the inverter is a two-stage inverter.

In an embodiment, the electrical signal is a voltage signal or a current signal.

In another aspect of the present disclosure, the rapid shutdown system includes: an inverter and at least one photovoltaic string. Each of the at least one photovoltaic string includes multiple shutdown devices and photovoltaic modules. The photovoltaic modules are connected to input ends of the plurality of shutdown devices, respectively. Output ends of the multiple shutdown devices are connected in series to form two terminals serving as an output end of the photovoltaic string, and the two terminals are connected to corresponding ports of the inverter at a direct-current side of the inverter The inverter is configured to, in cooperation with each of the multiple shutdown devices, perform the method according to the above aspect of the present disclosure.

In an embodiment, the inverter is a single-stage inverter or a two-stage inverter.

In an embodiment, an inverter bridge in the inverter is an H bridge or a half bridge.

In an embodiment, the shutdown device includes a switch module, an auxiliary power supply, an input voltage acquiring unit, an output voltage acquiring unit, a low-voltage power supply, a processor, a driving circuit, a capacitor, a first diode, a second diode, and a current sampling circuit. The switch module is arranged on a transmission branch between an input end and an output end of the shutdown device, and is configured to be controlled by the processor via the driving circuit. The auxiliary power supply is configured to acquire power from the input end of the shutdown device and supply power to the processor. The input voltage acquiring unit is connected to a positive input terminal and a negative input terminal of the shutdown device, and is communicatively connected to the processor. The output voltage acquiring unit is connected to a positive output terminal and a negative output terminal of the shutdown device, and is communicatively connected to the processor. The low-voltage power supply is connected to the positive output terminal of the shutdown device via the first diode, and is connected to the negative output terminal of the shutdown device via the capacitor. An anode of the second diode is connected to the negative output terminal of the shutdown device, and a cathode of the second diode is connected to the positive output terminal of the shutdown device. The current sampling circuit is communicatively connected to the processor, is connected on a negative transmission branch between the input end and the output end of the shutdown device, and is arranged between the second diode and the negative output terminal of the shutdown device.

It can be seen from the above technical solutions that in method for controlling the rapid shutdown system according to the present disclosure. The disturbance is applied to the direct-current side of the inverter only when the inverter does not meet the starting condition, i.e., before the inverter starts. Once meeting the starting condition, the inverter normally operates. Then, the shutdown device can determine its state by determining whether the electrical signal at its output end meets the preset condition. Therefore, compared with the conventional technology, it takes less time to apply the disturbance to the direct-current side of the inverter with the method according to the present disclosure, so that the controlling of the photovoltaic rapid shutdown system can be simplified and the impact on the MPPT can be reduced, thereby reducing the loss of production of electricity.

BRIEF DESCRIPTION OF THE DRAWINGS

In order to more clearly illustrate technical solutions in embodiments of the present disclosure or in the conventional technology, the drawings to be used in the description of the embodiments or the conventional technology are briefly described below. Apparently, the drawings in the following description show only some embodiments of the present disclosure, and other drawings may be obtained by those skilled in the art from the drawings without any creative work.

DETAILED DESCRIPTION

Technical solutions of embodiments of the present disclosure are clearly and completely described hereinafter in conjunction with the drawings of the embodiments of the present disclosure. Apparently, the described embodiments are only part rather than all of the embodiments of the present disclosure. Other embodiments obtained by those skilled in the art without any creative efforts based on the embodiments of the present disclosure fall within the protection scope of the present disclosure.

The relationship terminologies such as "first" and "second" herein are only used to distinguish one entity or operation from another, rather than to necessitate or imply that the actual relationship or order exists between the entities or operations. Moreover, terms of "include", "comprise" or any other variants thereof are intended to be non-exclusive. Therefore, a process, method, article or device including a series of elements includes not only these elements but also other elements that are not clearly enumerated, or further includes elements inherent in the process, method, article or device. Unless expressively limited, the statement "comprising a . . . " does not exclude the case that other similar elements may exist in the process, method, article or device including the series of elements.

A method for controlling a rapid shutdown system is provided according to an embodiment of the present disclosure in order to simplify the control of the rapid shutdown system.

Figure 2:
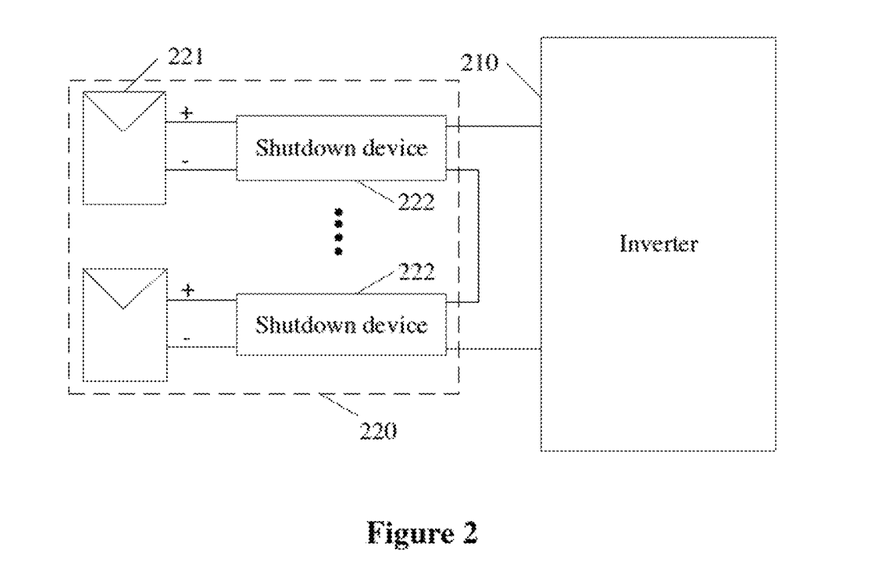
FIG. 2 is a schematic structural diagram illustrating a rapid shutdown system according to the present disclosure.

As shown in FIG. 2, the rapid shutdown system includes an inverter and a photovoltaic string. The photovoltaic string includes multiple shutdown devices and multiple photovoltaic modules. The multiple photovoltaic modules are connected to input ends of the multiple shutdown devices, respectively. In the photovoltaic string, output ends of the multiple shutdown devices are connected in series to form a branch, and two terminals of the branch serve as an output end of the photovoltaic string and are connected to corresponding ports of the inverter at a direct-current side of the inverter.

Figure 1:
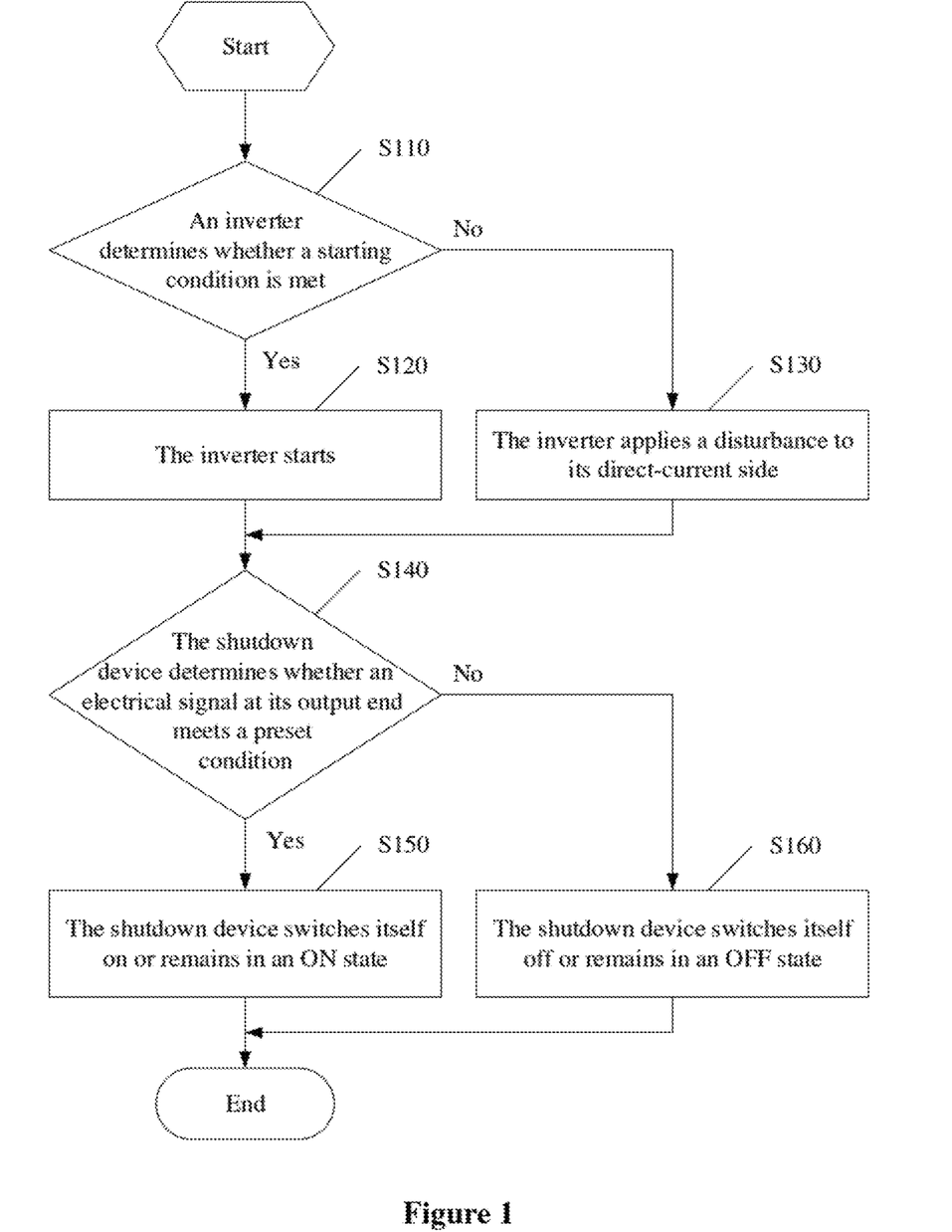
FIG. 1 is a schematic flow chart illustrating a method for controlling a rapid shutdown system according to the present disclosure.

A process of the method for controlling the rapid shutdown system is shown in FIG. 1, and the method includes the following steps S110 to S160.

In step S110, the inverter determines whether itself meets a starting condition.

In the rapid shutdown system, the inverter determines a current state of itself on receipt of a starting command, so as to determine whether the inverter is ready to start. The inverter starts when a voltage at the direct-current side of the inverter reaches a starting voltage. Therefore, the starting condition in the step S110 may include that the voltage at the direct-current side of the inverter reaches the starting voltage. In practice, the starting condition may include other contents, which are common knowledge and thus are not detailed herein.

The method proceeds to step S120 if the inverter is determined as already meeting the starting condition. The method proceeds to step S130 if the inverter is determined as not meeting the starting condition.

In step S120, the inverter starts.

Figure 5:
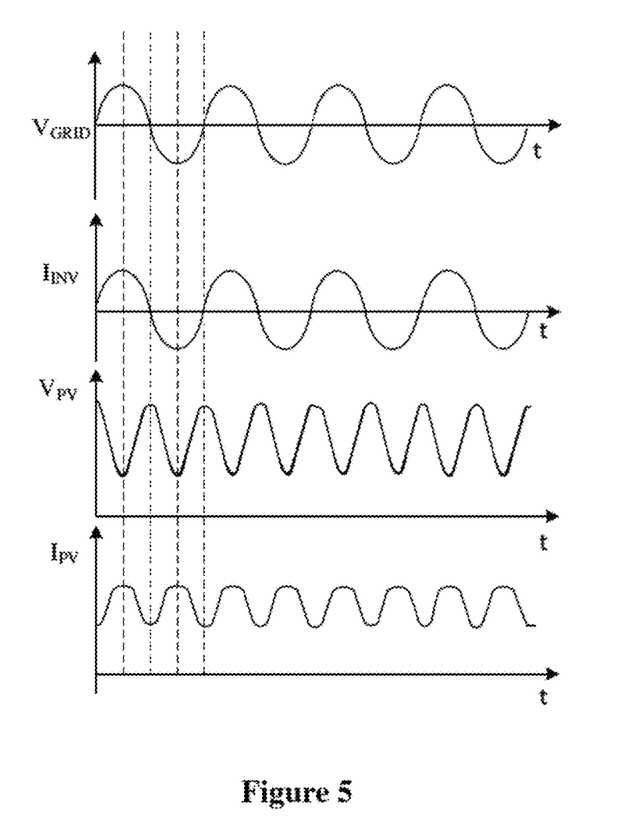
FIG. 5 is a schematic structural diagram illustrating a voltage fluctuation and a current fluctuation at a direct-current side of a single-stage inverter, a voltage fluctuation of a power grid, and a grid-connected current fluctuation after the single-stage inverter starts.

In a case that the inverter is a single-stage inverter, there is a direct-current ripple at the direct-current side of the inverter after the inverter starts due to coupling between power at the direct-current side of the inverter and output power of the inverter, as shown in FIG. 5. $V_{pv}$ represents a voltage at the direct-current side of the inverter, and $I_{pv}$ represents a current at the direct-current side of the inverter. $V_{pv}$ and $I_{pv}$ have the same frequency as a grid voltage $V_{GRID}$ and a grid-connected current $I_{I2V}$.

In a case that the inverter is a two-stage inverter, a bus capacitor arranged between two terminals of the direct-current bus of the inverter, that is, a capacitor arranged between two terminals of a bus that connects an output end of a direct-current conversion circuit and a direct-current side of an inverter bridge, generates a double line frequency ripple after the inverter starts.

However, in a case that the voltage at the direct-current side of the inverter is less than a preset voltage, e.g., 600V, the direct-current conversion circuit of the inverter generally generates a signal with the same frequency as the double line frequency ripple based on a double line frequency ripple suppression algorithm, so as to offset the double line frequency ripple generated by the bus capacitor. In the present disclosure, the double line frequency ripple suppression algorithm is unnecessary since the inverter unnecessarily offsets the double line frequency ripple. Since a control bandwidth of the direct-current conversion circuit of the inverter is much greater than a bandwidth of the double line frequency ripple, the double line frequency ripple can be transmitted to the direct-current side of the inverter.

When the voltage at the direct-current side of the inverter is greater than the preset voltage, the direct-current conversion circuit normally operates in a shoot through mode in order to protect switch transistors in the direct-current conversion circuit. Therefore, the double line frequency ripple is transmitted to the direct-current side of the inverter.

As shown in FIG. 2, in each photovoltaic string, all the shutdown devices are connected in series at the direct-current side of the inverter. Therefore, an electrical signal with the same frequency as the ripple at the direct-current side of the inverter is generated at an output end of each of the shutdown devices.

In step S130, the inverter applies a disturbance to the direct-current side of the inverter.

In a case that the inverter is the single-stage inverter, the inverter is first disconnected from a downstream circuit (i.e., a power grid or a load), and then controls at least one branch in an inverter bridge of the inverter to be switched on and off at preset intervals, so as to apply the disturbance.

In a case that the inverter is the two-stage inverter, the inverter is disconnected from a downstream circuit, then controls the direct-current conversion circuit to operates in the shoot through mode, that is, the direct-current conversion circuit is short-circuited. Next, the inverter controls at least one branch in an inverter bridge of the inverter to be switched on and off at preset intervals, so as to apply the disturbance.

In a case that the inverter is the two-stage inverter, the inverter is first disconnected from the downstream circuit, and then controls a switch transistor between a positive branch and a negative branch in the direct-current conversion circuit to be switched on and off at preset intervals, so as to apply the disturbance.

As shown in FIG. 2, in each photovoltaic string, all the shutdown devices are connected in series at the direct-current side of the inverter. Therefore, when the disturbance is applied to the direct-current side of the inverter, a disturbance with the same frequency is applied to an output end of each of the shutdown devices.

Figure 3:
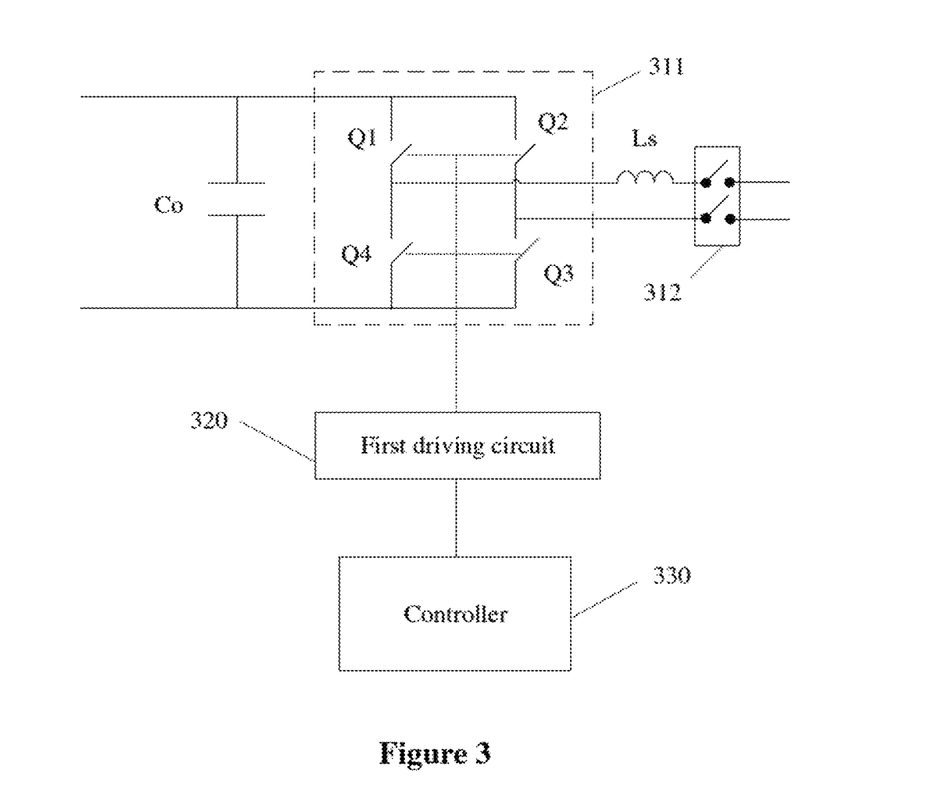
FIG. 3 is a schematic structural diagram illustrating a single-stage inverter according to an embodiment of the present disclosure.
Figure 6:
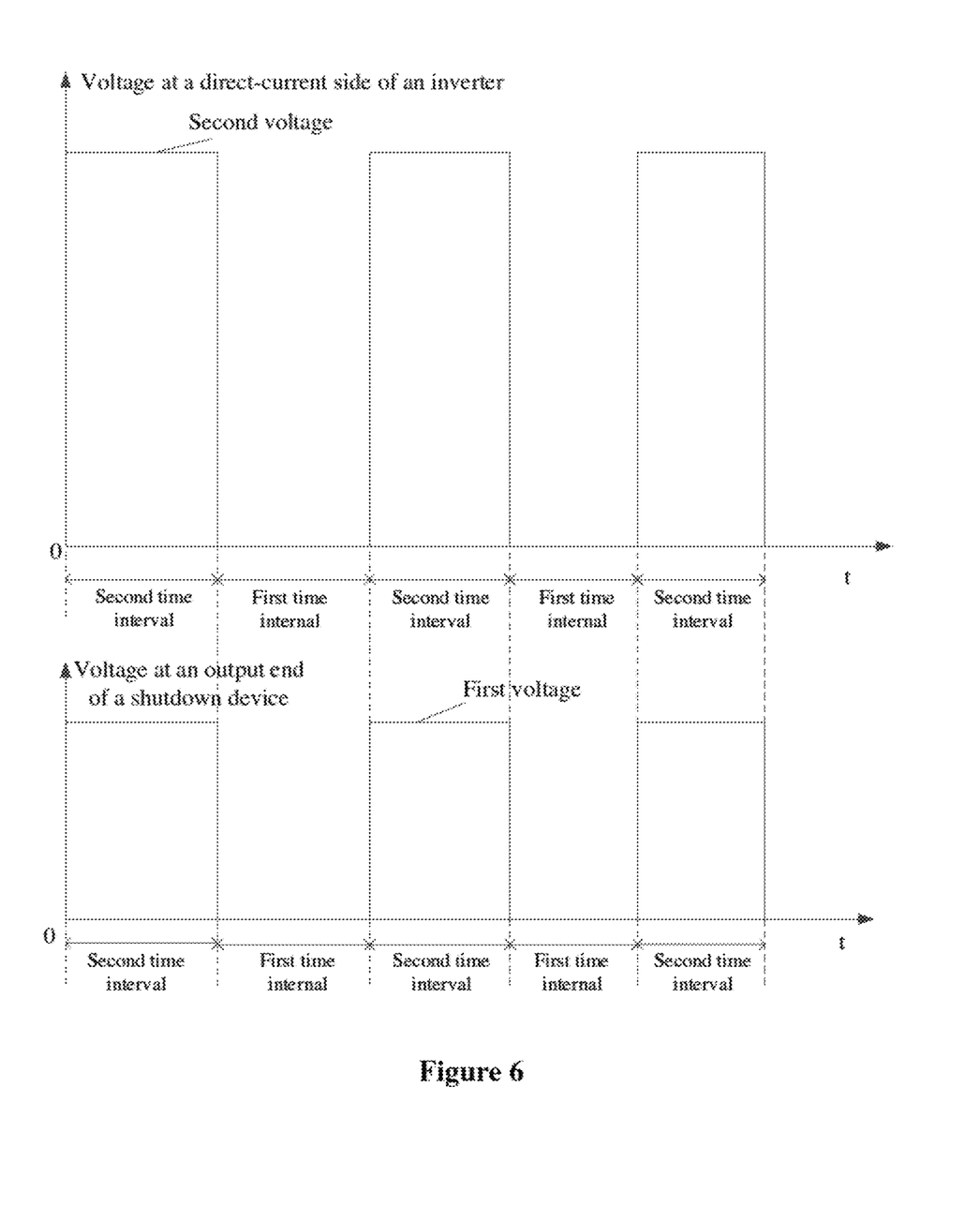
FIG. 6 is a schematic diagram illustrating a voltage fluctuation at a direct-current side of an inverter and a voltage fluctuation at an output end of a shutdown device after a disturbance is applied to the direct-current side of the inverter.

In a first example, as shown in FIG. 3, after being disconnected from the downstream circuit, the single-stage inverter first controls switch transistors in the same branch in the inverter, e.g., a first switch transistor Q1 and a fourth switch transistor Q4 in a first branch, to be on for a first preset time interval to short-circuit a positive terminal and a negative terminal at the direct-current side of the inverter and then to be off for a second preset time interval to stop short-circuiting the positive terminal and the negative terminal at the direct-current side of the inverter, and so on. In this way, a second voltage as shown in FIG. 6 is generated at the direct-current side of the inverter, and a first voltage as shown in FIG. 6 is generated at the output end of the shutdown device. A sum of the first preset time interval and the second preset time interval is equal to a preset period.

Figure 4:
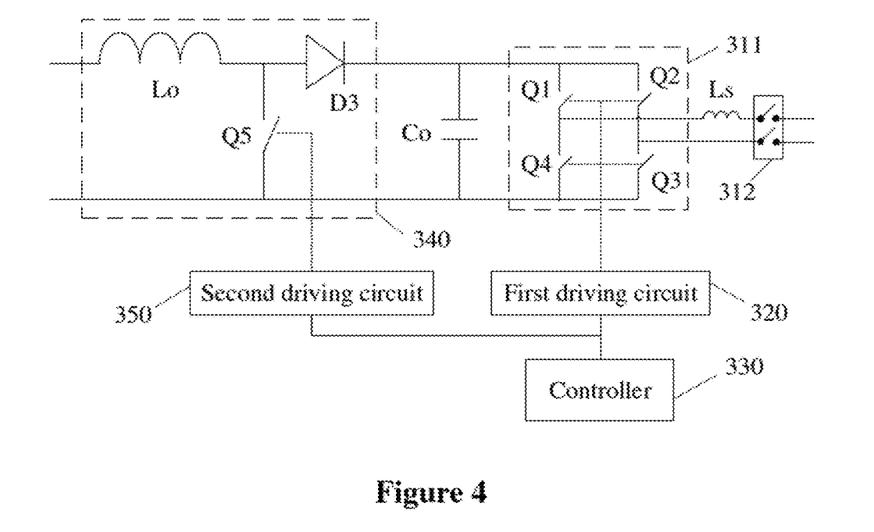
FIG. 4 is a schematic structural diagram illustrating a two-stage inverter according to an embodiment of the present disclosure.

In a second example, as shown in FIG. 4, after being disconnected from the downstream circuit, the two-stage inverter first operates the direct-current conversion circuit in the shoot through mode, that is, switches a fifth switch transistor Q5 between the positive branch and the negative branch in the direct-current conversion circuit off. Next, the two-stage inverter controls switch transistors in a branch in the inverter, e.g., a first switch transistor Q1 and a fourth switch transistor Q4 in a first branch, to be on for a first preset time interval and then to be off for a second preset time interval, and so on. In this way, the second voltage as shown in FIG. 6 is generated at the direct-current side of the inverter, and the first voltage as shown in FIG. 6 is generated at the output end of each of the shutdown devices. A sum of the first preset time interval and the second preset time interval is equal to the preset period.

In a third example, as shown in FIG. 4, after being disconnected from the downstream circuit, the two-stage inverter applies the disturbance via the fifth switch transistor Q5 in the direct-current conversion circuit. Specifically, the two-stage inverter controls the fifth switch transistor Q5 in the direct-current conversion circuit to be on for a first preset time interval and then to be off for a second preset time interval, and so on. In this way, the second voltage as shown in FIG. 6 is generated at the direct-current side of the inverter, and the first voltage as shown in FIG. 6 is generated at the output end of each of the shutdown devices. A sum of the first preset time interval and the second preset time interval is equal to the preset period.

It should be noted that from the above three examples, the inverter applies the disturbance in essence by short-circuiting and stopping short-circuiting the two terminals at the direct-current side of the inverter at preset intervals. Therefore, in practice, the applying the disturbance includes but is not limited to the above three examples but depends on the specific situation. All the implementations fall within the protection scope of the present disclosure.

The method for controlling the rapid shutdown system proceeds to the following step S140 after steps S120 and S130.

In step S140, the shutdown device determines whether the electrical signal at its output end meets a preset condition.

In step S140, the preset condition may be that the electrical signal at the output end of the shutdown device has such preset fluctuation that the shutdown device remains in an ON state. Therefore, in a case that the electrical signal already meets the preset condition, step S150 is performed. In a case that the electrical signal does not meet the preset condition, step S160 is performed.

In practice, the preset fluctuation may be in the following forms.

If step S140 follows step S130, the preset fluctuation is a preset pulse. The preset pulse is an electrical signal generated by short-circuiting and stopping short-circuiting the two terminals at the direct-current side of the inverter at preset intervals. Details have been described above, and therefore are described in brief here.

If step S140 follows step S120 and the inverter is the single-stage inverter, the preset fluctuation is a direct-current ripple resulted from coupling between the power at the alternating-current side of the single-stage inverter and the power at the direct-current side of the inverter. If step S140 follows step S120 and the inverter is the two-stage inverter, the preset fluctuation is the double line frequency ripple presented at the direct-current side without applying the double line frequency ripple suppression algorithm of the direct-current conversion circuit in the inverter.

In an embodiment, the electrical signal is a voltage signal or a current signal. In another embodiment, the electrical signal includes both a voltage signal and a current signal.

In practice, the electrical signal may be in other forms, which is not limited herein and depends on the specific situation. All the implementations fall within the protection scope of the present disclosure.

In step S150, the shutdown device switches itself on or remains in an ON state.

Normally, as shown in FIG. 2, the shutdown device is in an OFF state before the inverter starts. Therefore, the shutdown device switches itself on in step S150 if step S140 follows step S130, that is, before the inverter starts.

The shutdown device is in the ON state after the inverter starts. Therefore, the shutdown device remains in the ON state in step S150 if step S140 follows step S120.

In step S160, the shutdown device remains in the OFF state or switches itself off.

Normally, as shown in FIG. 2, the shutdown device is in the OFF state before the inverter starts. Therefore, the shutdown device remains in the OFF state in step S160 if step S140 follows step S130, that is, before the inverter starts.

The shutdown device is in the ON state after the inverter starts. Therefore, the shutdown device switches itself off in step S160 if step S140 follows step S120.

In the photovoltaic rapid shutdown system shown in FIG. 2, on receipt of the starting command, the inverter does not start and applies a disturbance at its direct-current side if not meeting the starting condition. The shutdown device switches itself on in response to its determination that the electrical signal at its output end meets the preset condition, so as to increase a voltage at the output end. Accordingly, the voltage at the direct-current side of the inverter increases and therefore the inverter meets the starting condition, and then the inverter starts. Next, the inverter normally operates, so that a fluctuation related to an electrical signal of the power grid is generated at the direct-current side of the inverter. Accordingly, the electrical signal at the output end of the shutdown device also meets the preset condition, and therefore the shutdown device remains in the ON state.

In summary, in the method for controlling the rapid shutdown system, the disturbance is applied to the direct-current side of the inverter only when the inverter does not meet the starting condition. Once meeting the starting condition, the inverter normally operates. Then, the shutdown device can determine its state by determining whether the electrical signal at its output end meets the preset condition. Therefore, compared with the conventional technology, it takes less time to apply the disturbance to the direct-current side of the inverter with the method according to the present disclosure, so that the controlling of the photovoltaic rapid shutdown system can be simplified and the impact on the MPPT can be reduced, thereby reducing the loss of production of electricity.

It should be noted that in the conventional technology, a shutdown device in the rapid shutdown system normally remains in the ON state relying on a communication signal. However, under harsh conditions, for example, the communication signal transmitted through a long direct-current cable or a power line involved heavy switching noise is prone to attenuation or interference, and the shutdown device fails to detect the communication signal as the conduction signal and switches itself off. This results in undervoltage at the direct-current side of the inverter connected downstream of the shutdown device and consequently shutdown of the inverter. The inverter spends time on a power-on self-test before resuming operating, resulting in a decline in production of electricity.

However, in the method for controlling the rapid shutdown system according to the present disclosure, the shutdown device switches itself on or off based on the electrical signal instead of the communication signal. Therefore, the case that the shutdown device mistakenly switches itself off in response to its failure to receive the communication signal can be successfully avoided, thereby improving the production of electricity of the rapid shutdown system.

In addition, an additional transmission device is essential to each of the shutdown devices in the rapid shutdown system according to the conventional technology in order to control the shutdown device based on the communication signal relying on the communication means of PLC for example, resulting in high cost of the rapid shutdown system.

In the method for controlling the rapid shutdown system according to the present disclosure, no transmission device is arranged for the shutdown device since no communication signal is involved in controlling the shutdown device, so as to reduce the cost of the rapid shutdown system.

A rapid shutdown system is provided according to another embodiment of the present disclosure, as shown in FIG. 2. The rapid shutdown system includes an inverter 210 and at least one photovoltaic string 220. Each of the at least one photovoltaic string 220 includes multiple shutdown devices 222 and multiple photovoltaic modules 221. The photovoltaic modules 221 are connected to input ends of the multiple shutdown devices 222, respectively.

In each of the at least one photovoltaic string 220, output ends of the multiple shutdown devices 222 are connected in series to form a branch, and two terminals of the branch serve as an output end of the photovoltaic string 220 and are connected to corresponding ports of the inverter 210 at the a direct-current side of the inverter 210.

In the rapid shutdown system, the inverter 210 cooperates with each of the multiple shutdown devices 222 to perform the method for controlling the rapid shutdown system according to the above embodiments, so as to switch on or off the shutdown device 222. In addition, the inverter 210 converts direct-current power to alternating-current power as usual, which is common knowledge and thus not detailed herein.

The inverter 210 may be a single-stage inverter as shown in FIG. 3 or a two-stage inverter as shown in FIG. 4, depending on specific situations, and which is not limited herein.

In an embodiment, an inverter bridge in the inverter 210 is an H bridge, as shown in FIGS. 3 and 4. In practice, the inverter bridge may be a half bridge or the like, depending on specific situations, and which is not limited herein.

As shown in FIG. 3, the single-stage inverter according to the embodiment of the present disclosure includes a bus capacitor Co, a first driving circuit 320, a controller 330, an H bridge 311, an output inductor Ls, and an alternating-current relay 312.

In the embodiment, a direct-current side of the H bridge 311 is connected to a direct-current side of the single-stage inverter through a direct-current bus. The bus capacitor Co is arranged between a positive terminal and a negative terminal of the direct-current bus. A midpoint of a first branch in the H bridge 311 is connected to an alternating-current side of the single-stage inverter via the output inductor Ls and the alternating-current relay 312 sequentially. A midpoint of a second branch in the H bridge 311 is connected to the alternating-current side of the single-stage inverter via the alternating-current relay 312. The controller 330 is configured to control all switch transistors in the H bridge 311 via the first driving circuit 320.

The first branch in the H bridge 311 includes a first switch transistor Q1 and a fourth switch transistor Q4 that are connected in series. The second branch in the H bridge 311 includes a second switch transistor Q2 and a third switch transistor Q3 that are connected in series.

The above embodiment shows the single-stage inverter only in one form. In practice, the single-stage inverter includes this one but is not limited thereto, depending on specific situations.

As shown in FIG. 4, the two-stage inverter according to the embodiment of the present disclosure includes a bus capacitor Co, a direct-current conversion circuit 340, a first driving circuit 320, a second driving circuit 350, a controller 330, a H bridge 311, an output inductor Ls, and an alternating-current relay 312.

In the embodiment, an input end of the direct-current conversion circuit 340 is connected to a direct-current side of the two-stage inverter, and an output end of the direct-current conversion circuit 340 is connected to a direct-current side of the H bridge 311 via a direct-current bus. The bus capacitor Co is arranged between a positive terminal and a negative terminal of the direct-current bus. A midpoint of a first branch in the H bridge 311 is connected to an alternating-current side of the inverter via the output inductor Ls and the alternating-current relay 312 sequentially. A midpoint of a second branch in the H bridge 311 is connected to the alternating-current side of the inverter via the alternating-current relay 312. The controller 330 is configured to control all switch transistors in the H bridge 311 via the first driving circuit 320, and control a switch transistor in the direct-current conversion circuit 340 via the second driving circuit 350.

The direct-current conversion circuit 340 includes an input inductor Lo, a third diode D3, and a fifth switch transistor Q5. A positive input terminal of the direct-current conversion circuit 340 is connected to a positive output terminal of the direct-current conversion circuit 340 through the input inductor Lo and the third diode D3 sequentially. A terminal of the fifth switch transistor Q5 is connected to a joint between the input inductor Lo and the third diode D3, and another terminal of the fifth switch transistor Q5 is connected to a negative input terminal and a negative output terminal of the direct-current conversion circuit 340.

The first branch in the H bridge 311 includes a first switch transistor Q1 and a fourth switch transistor Q4 that are connected in series. The second branch in the H bridge 311 includes a second switch transistor Q2 and a third switch transistor Q3 that are connected in series.

The above embodiment shows the two-stage inverter only in one form. In practice, the two-stage inverter includes this one but is not limited thereto, depending on specific situations.

Figure 7:
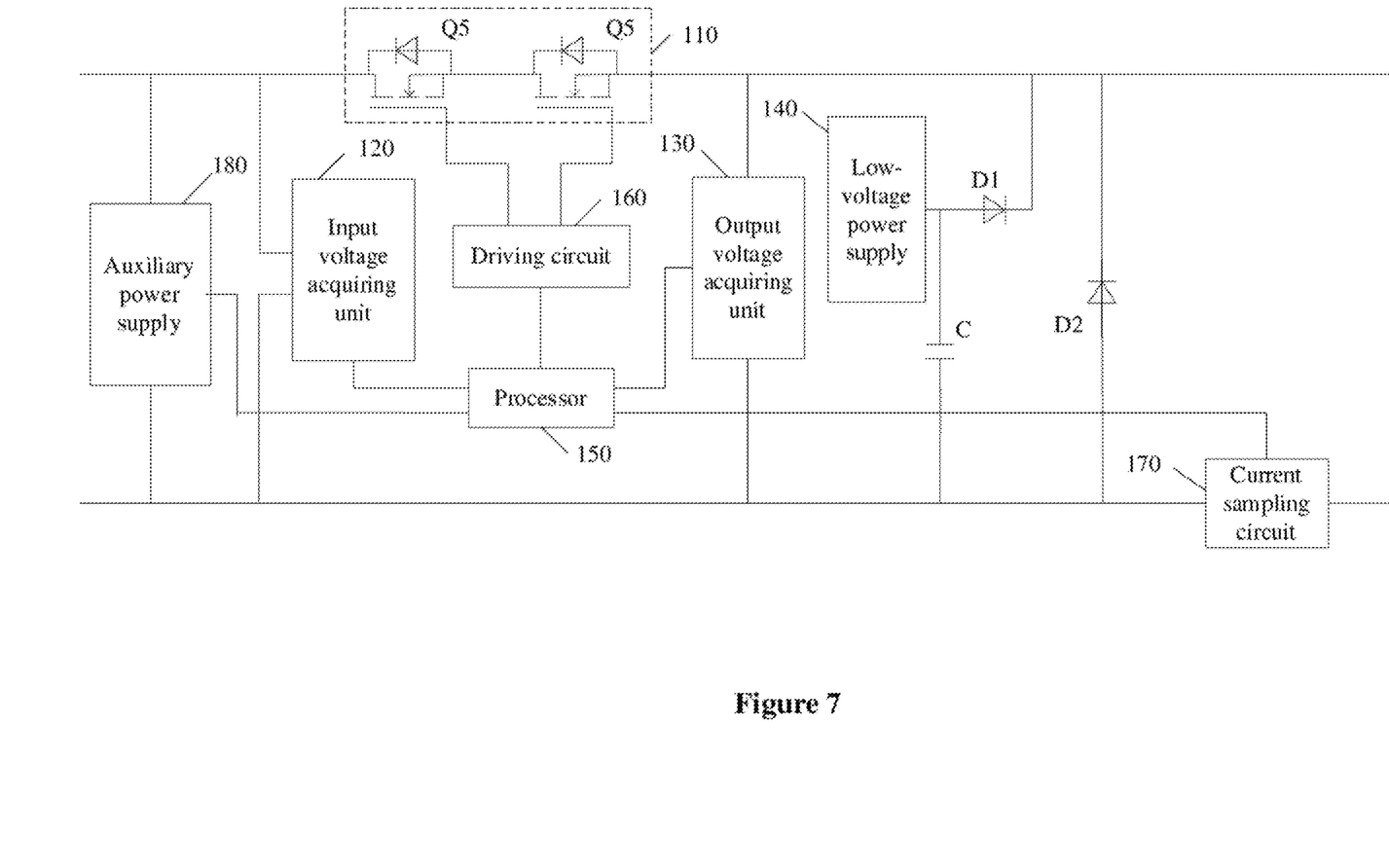
FIG. 7 is a schematic structural diagram illustrating a shutdown device according to an embodiment of the present disclosure.

A shutdown device 222 is further provided according to an embodiment of the present disclosure, as shown in FIG. 7. The shutdown device 222 includes a switch module 110, an auxiliary power supply 180, an input voltage acquiring unit 120, an output voltage acquiring unit 130, a low-voltage power supply 140, a processor 150, a driving circuit 160, a capacitor C, a first diode D1, a second diode D2, and a current sampling circuit.

The switch module 110 is arranged on a transmission branch between an input end and an output end of the shutdown device 222, and is controlled by the processor 150 through the driving circuit 160. The auxiliary power supply 180 acquires power from the input end of the shutdown device, and supplies power to the processor 150. The input voltage acquiring unit 120 is connected to a positive input terminal and a negative input terminal of the shutdown device 222, and is communicatively connected to the processor 150. The output voltage acquiring unit 130 is connected to a positive output terminal and a negative output terminal of the shutdown device 222, and is communicatively connected to the processor 150. The low-voltage power supply 140 is connected to the positive output terminal of the shutdown device 222 through the first diode D1, and is connected to the negative output terminal of the shutdown device 222 through the capacitor C. The second diode D2 is arranged outside the capacitor C and the first diode D1. An anode of the second diode D2 is connected to the negative output terminal of the shutdown device 222, and a cathode of the second diode D2 is connected to the positive output terminal of the shutdown device. The current sampling circuit is communicatively connected to the processor 150. The current sampling circuit is connected in series in a negative transmission branch between the input end and the output end of the shutdown device 222, and the current sampling circuit is arranged between the second diode D2 and the negative output terminal of the shutdown device.

In an embodiment, the switch module 110 includes multiple fifth switch transistors Q5 that are connected in series, which is not limited herein and depends on specific situations.

The above embodiment shows the shutdown device 222 only in one form. In practice, the shutdown device 222 includes this one but is not limited thereto, depending on specific situations.

According to the above description of the disclosed embodiments, features described in the embodiments of the present disclosure may be replaced or combined with each other, so that those skilled in the art can implement or practice the present disclosure. The foregoing embodiments are only preferred embodiments of the present disclosure, and are not intended to limit the present disclosure in any form. The preferred embodiments of the present disclosure are disclosed above, and are not intended to limit the present disclosure. Based on method and technical solutions disclosed above, those skilled in the art may make many possible changes and modifications to the technical solutions of the present disclosure, or make some equivalent variations on the embodiments without departing from the scope of the technical solutions of the present disclosure. Therefore, any simple modifications, equivalent changes and modifications made to the above embodiments based on the technical essence of the present disclosure without departing from the technical solutions of the present disclosure shall fall within the protection scope of the technical solutions of the present disclosure.

The invention claimed iss:

1. A method for controlling a rapid shutdown system, comprising:
   determining whether a starting condition is met, by an inverter in the rapid shutdown system;
   starting the inverter if it is determined that the starting condition is already met, and applying a disturbance to a direct-current side of the inverter by the inverter if it is determined that the starting condition is not met;
   determining whether an electrical signal at an output end of a shutdown device in the rapid shutdown system meets a preset condition, by the shutdown device; and
   switching the shutdown device on or maintaining the shutdown device in an ON state if it is determined that the electrical signal already meets the preset condition, and switching the shutdown device off or maintaining the shutdown device in an OFF state if it is determined that the electrical signal does not meet the preset condition.

2. The method according to claim 1, wherein the determining whether the electrical signal at the output end of the shutdown device in the rapid shutdown system meets the preset condition follows the applying the disturbance to the direct-current side of the inverter by the inverter, and wherein
   the shutdown device switches itself on if it is determined that the electrical signal already meets the preset condition; or
   the shutdown device remains in the OFF state if it is determined that the electrical signal does not meet the preset condition.

3. The method according to claim 1, wherein the determining whether the electrical signal at the output end of the shutdown device in the rapid shutdown system meets the preset condition follows the starting the inverter, and wherein
   the shutdown device remains in the ON state if it is determined that the electrical signal already meets the preset condition; or
   the shutdown device switches itself off if it is determined that the electrical signal does not meet the preset condition.

4. The method according to claim 1, wherein the inverter is a single-stage inverter, and wherein the applying the disturbance comprises:
   disconnecting the inverter from a downstream circuit and switching at least one branch in an inverter bridge in the inverter on and off at preset intervals.

5. The method according to claim 1, wherein the inverter is a two-stage inverter, and wherein the applying the disturbance comprises:
   disconnecting the inverter from a downstream circuit, operating a direct-current conversion circuit in the inverter in a shoot through mode, and switching at least one branch in an inverter bridge in the inverter on and off at preset intervals.

6. The method according to claim 1, wherein the inverter is a two-stage inverter, and wherein the applying the disturbance comprises:
   disconnecting the inverter from a downstream circuit and switching a switch transistor between a positive branch and a negative branch in a direct-current conversion circuit in the inverter on and off at preset intervals.

7. The method according to claim 1, wherein
   the starting condition is that a voltage at the direct-current side of the inverter reaches a starting voltage of the inverter.

8. The method according to claim 1, wherein
   the preset condition is that the electrical signal has a preset fluctuation.

9. The method according to claim 8, wherein
   the determining whether the electrical signal at the output end of the shutdown device in the rapid shutdown system meets the preset condition follows the applying the disturbance to the direct- current side of the inverter by the inverter, and wherein the preset fluctuation is a preset pulse.

10. The method according to claim 8, wherein
    the determining whether the electrical signal at the output end of the shutdown device in the rapid shutdown system meets the preset condition follows the starting the inverter, and wherein the preset fluctuation is a direct-current ripple due to coupling between alternating-current power and direct-current power of the inverter in a case that the inverter is a single-stage inverter; and
    the preset fluctuation is a double line frequency ripple at the direct-current side of the inverter presented without applying a double line frequency ripple suppression algorithm for a direct-current conversion circuit in the inverter in a case that the inverter is a two-stage inverter.

11. The method according to claim 8, wherein
    the electrical signal is a voltage signal or a current signal.

12. A rapid shutdown system, comprising:
    an inverter; and
    at least one photovoltaic string, wherein each of the at least one photovoltaic string comprises:
    a plurality of shutdown devices, and photovoltaic modules connected to input ends of the plurality of shutdown devices, respectively, wherein output ends of the plurality of shutdown devices are connected in series to form two terminals serving as an output end of the photovoltaic string, and the two terminals are connected to corresponding ports of the inverter at a direct-current side of the inverter; and the inverter is configured to, in cooperation with each of the plurality of shutdown devices, perform the method according to claim 1.

13. The rapid shutdown system according to claim 12, wherein the inverter is a single-stage inverter or a two-stage inverter.

14. The rapid shutdown system according to claim 12, wherein an inverter bridge in the inverter is an H bridge or a half bridge.

15. The rapid shutdown system according to claim 12, wherein each of the plurality of shutdown devices comprises:

a switch module;
an auxiliary power supply;
an input voltage acquiring unit;
an output voltage acquiring unit;
a low-voltage power supply;
a processor;
a driving circuit;
a capacitor;
a first diode;
a second diode; and
a current sampling circuit, wherein, the switch module is arranged on a transmission branch between an input end and an output end of the shutdown device, and is configured to be controlled by the processor via the driving circuit;

the auxiliary power supply is configured to acquire power from the input end of the shutdown device and supply power to the processor;

the input voltage acquiring unit is connected to a positive input terminal and a negative input terminal of the shutdown device, and is communicatively connected to the processor;

the output voltage acquiring unit is connected to a positive output terminal and a negative output terminal of the shutdown device, and is communicatively connected to the processor;

the low-voltage power supply is connected to the positive output terminal of the shutdown device via the first diode, and is connected to the negative output terminal of the shutdown device via the capacitor;

an anode of the second diode is connected to the negative output terminal of the shutdown device, and a cathode of the second diode is connected to the positive output terminal of the shutdown device; and the current sampling circuit is communicatively connected to the processor, is connected on a negative transmission branch between the input end and the output end of the shutdown device, and is arranged between the second diode and the negative output terminal of the shutdown device.

* * * * *